(12) United States Patent
Olson et al.

(10) Patent No.: US 12,501,734 B2
(45) Date of Patent: Dec. 16, 2025

(54) ELECTRO-OPTICAL PHYSIOLOGIC SENSOR

(71) Applicant: Starkey Laboratories, Inc., Eden Prairie, MN (US)

(72) Inventors: Kyle Olson, St. Louis Park, MN (US); Sidney A. Higgins, Maple Grove, MN (US); Michael Karl Sacha, Chanhassen, MN (US); Andy S. Lin, Eden Prairie, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 1044 days.

(21) Appl. No.: 17/544,727

(22) Filed: Dec. 7, 2021

(65) Prior Publication Data

US 2022/0190188 A1  Jun. 16, 2022

Related U.S. Application Data

(60) Provisional application No. 63/126,426, filed on Dec. 16, 2020.

(51) Int. Cl.
  *H10F 55/255* (2025.01)
  *A61B 5/026* (2006.01)
  *A61B 5/1455* (2006.01)

(52) U.S. Cl.
  CPC ......... *H10F 55/255* (2025.01); *A61B 5/0261* (2013.01); *A61B 5/14552* (2013.01)

(58) Field of Classification Search
  CPC . H01L 31/173; A61B 5/0261; A61B 5/14552; A61B 5/02141; A61B 5/0075;
  (Continued)

(56) References Cited

U.S. PATENT DOCUMENTS

| 4,955,729 A | 9/1990 | Marx |
| 8,647,270 B2 | 2/2014 | Leboeuf et al. |

(Continued)

FOREIGN PATENT DOCUMENTS

| EP | 3057139 | 8/2016 |
| WO | WO 2014116924 A1 | 7/2014 |

OTHER PUBLICATIONS

PCT Search Report and Written Opinion for PCT/US2021/062218 dated Mar. 18, 2022 (11 pages).

(Continued)

*Primary Examiner* — Patricia D Valenzuela
(74) *Attorney, Agent, or Firm* — Mueting Raasch Group (57) ABSTRACT

An electro-optical physiologic sensor comprises a printed circuit board (PCB) and a light emitter and a photodetector respectively mounted to the PCB. A first sensor element is disposed on the PCB and comprises a first electrode configured to contact tissue of a subject and a first light channel co-located with the first electrode, the first light channel optically coupled to the light emitter and configured to direct light into the subject's tissue. A second sensor element is disposed on the PCB and comprises a second electrode configured to contact the subject's tissue and a second light channel co-located with the second electrode, the second light channel optically coupled to the photodetector and configured to receive light from the tissue of the subject resulting from the light generated by the light emitter.

24 Claims, 6 Drawing Sheets

(58) Field of Classification Search
CPC ....... A61B 5/02427; A61B 5/053; A61B 5/25; A61B 5/6843; A61B 5/721; H10F 55/255
See application file for complete search history.

(56) References Cited

U.S. PATENT DOCUMENTS

| | | |
|---|---|---|
| 2015/0018649 A1* | 1/2015 | Lisogurski ......... A61B 5/14552 |
| | | 600/323 |
| 2018/0020975 A1* | 1/2018 | Pohjonen ............... A61B 5/282 |
| | | 600/485 |
| 2019/0098390 A1 | 3/2019 | Carino |
| 2020/0187809 A1 | 6/2020 | Larsen |
| 2020/0288253 A1 | 9/2020 | De Haan |

OTHER PUBLICATIONS

International Patent Application No. PCT/US2021/054966, filed Oct. 14, 2021; International Preliminary Report on Patentability issued Jun. 29, 2023; 9 pages.

\* cited by examiner

ELECTRO-OPTICAL PHYSIOLOGIC SENSOR

RELATED APPLICATIONS

This application claims the benefit of U.S. Provisional Application No. 63/126,426, filed Dec. 16, 2020, the content of which is hereby incorporated by reference.

TECHNICAL FIELD

This application relates generally to electro-optical physiologic sensors and sensing devices including cutaneous, subcutaneous, transcutaneous, and implantable medical and/or diagnostic devices, physiologic monitoring devices, biometric devices, personal activity monitoring device, personal amplification devices, hearing aids, bone conduction, and medical and consumer hearables.

SUMMARY

An electro-optical physiologic sensor comprises a printed circuit board (PCB) and a light emitter and a photodetector respectively mounted to the PCB. A first sensor element is disposed on the PCB and comprises a first electrode configured to contact tissue of a subject and a first light channel co-located with the first electrode, the first light channel optically coupled to the light emitter and configured to direct light into the subject's tissue. A second sensor element is disposed on the PCB and comprises a second electrode configured to contact the subject's tissue and a second light channel co-located with the second electrode, the second light channel optically coupled to the photodetector and configured to receive light from the tissue of the subject resulting from the light generated by the light emitter.

An electro-optical physiologic sensor comprises a printed circuit board (PCB), a light emitting unit connected to the PCB, and a light receiving unit connected to the PCB. The light emitting unit comprises a light emitter mounted to the PCB and a first optical window through which light produced by the light emitter can pass into tissue of a subject. The light receiving unit comprises a photodetector mounted to the PCB and a second optical window through which light received from the subject's tissue resulting from the light produced by the light emitter can pass. An optical barrier is disposed between the light emitting unit and the light receiving unit, and at least a tissue contacting surface of the first and second optical windows comprises optically transparent and electrically conductive material. An electrical insulator is disposed between the first and second optical windows.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings wherein:

FIG. 2A illustrates an electro-optical physiologic sensor in accordance with any of the embodiments disclosed herein;

FIG. 2A1 is a top view of the electro-optical physiologic sensor shown in FIG. 2A;

FIG. 2B1 is a top view of the electro-optical physiologic sensor shown in FIG. 2B;

FIG. 2C1 is a top view of the electro-optical physiologic sensor shown in FIG. 2C;

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Embodiments of the disclosure are directed to electro-optical physiologic sensors and sensing devices that facilitate electrode-based and optical-based sensing of one or more physiologic parameters or physiologic conditions of a subject. Embodiments of the disclosure are directed to electro-optical physiologic sensors and sensing devices that can include one or more of a pressure sensor, one or more temperature sensors, and one or more biochemical sensors. Embodiments of the disclosure are directed to physiologic sensors and sensing devices which include co-located electrode-based and optical-based sensing elements. Embodiments of the disclosure are directed to physiologic sensors and sensing devices which include co-located electrode-based and optical-based sensing elements and, additionally, one or more of a co-located pressure sensor, one or more co-located temperature sensors, and one or more co-located biochemical sensors.

Embodiments of physiologic sensors and sensing devices can include any two or more of the physiologic sensors disclosed herein arranged to be co-located relative to one another. In some embodiments, physiologic sensors and sensing devices can include any two or more of the physiologic sensors arranged to be co-located relative to one another and, in addition, include one or more other physiologic sensors disclosed herein spaced apart from the co-located physiologic sensors.

Embodiments of physiologic sensors and sensing devices disclosed herein can be implemented for deployment in cutaneous, subcutaneous, transcutaneous, and implantable medical and diagnostic devices, biometric devices, personal activity monitoring device, personal amplification devices, hearing aids, bone conduction hearing devices, and medical and consumer hearables.

Conventional optical physiologic sensors (e.g., PPG sensors) and electrode-based sensors (e.g., capacitive sensors, impedance sensors) can suffer from motion induced noise when worn during activities. It is desirable in many cases to measure accurate biometrics from the optical and electrode-based sensors during activity. In many cases, it is desirable to measure optical and electrical biomarkers simultaneously from the exact same position on the body. Embodiments of the disclosure are directed to a new measurement modality that can unlock new and/or more accurate biomarker readings, such as blood pressure, heart rate, oxygen saturation ($SpO_2$), blood glucose, respiration rate, and/or hydration, for example.

By having disparate physiologic sensors co-located and positionable at the same region of body tissue, the electro-optical sensor provides superior motion noise correlation as is possible. As such, the optical sensor signal noise can be canceled using the electrode-based sensor signal noise, and the electrode-based sensor signal noise can be canceled using the optical sensor signal noise. This arrangement provides a robust, virtually noise free signal for optical and electrical measurements of the tissue free of motion artifacts. This arrangement provides better noise artifact elimination or reduction than use of an IMU, because the IMU measures both motions of the entire system but not relative motion of the sensor against the tissue (e.g., skin). It is noted that an IMU would be beneficial for canceling noise that is not caused by relative motion of the sensor against the tissue (e.g., skin) but instead system motion.

In some embodiments, physiologic sensing devices of the present disclosure can include a tissue (e.g., skin) contact sensor and one or more physiologic sensors. Some physiologic sensing devices of the present disclosure (e.g., ear-worn electronic devices) can be relatively small, such that their power source capacity (e.g., battery capacity) is necessarily limited. Conserving battery capacity is an important objective when designing relatively small physiologic sensing devices, such as a hearing aid equipped with a physiologic sensing facility. Physiologic sensing devices disclosed herein include one or more physiologic sensors that consume varying amounts of power when in use. Physiologic sensing devices disclosed herein can also include a tissue (e.g., skin) contact sensor configured to sense contact between the device and tissue of a subject user.

The tissue (e.g., skin) contact sensor, alone or in cooperation with one or more other physiologic sensors, can be configured to prevent or limit false tissue-device detections (e.g., a false positive or a false negative). In response to detecting contact between the device and the subject's tissue (e.g., skin), the one or more physiologic sensors can be energized for sensing one or more physiologic parameters or physiologic conditions of the subject user. The one or more physiologic sensors can remain energized until a termination event is detected (e.g., expiration of a timer, collection of sufficient physiologic data) and/or the tissue contact sensor senses an absence of tissue-device contact. Physiologic sensing devices disclosed herein advantageously reduce or eliminate wasteful power consumption by physiologic and/or other sensors of the devices. Physiologic sensing devices disclosed herein provide for enhanced physiologic sensing due to robust sensing of tissue-device contact which can indicate that one or more physiologic sensors of the device are properly or optimally positioned relative to the subject user's tissue (e.g., skin) for operation.

Embodiments of the disclosure are defined in the claims. However, below there is provided a non-exhaustive listing of non-limiting examples. Any one or more of the features of these examples may be combined with any one or more features of another example, embodiment, or aspect described herein.

Example Ex1. An electro-optical physiologic sensor comprises a printed circuit board (PCB) and a light emitter and a photodetector respectively mounted to the PCB. A first sensor element is disposed on the PCB and comprises a first electrode configured to contact tissue of a subject and a first light channel co-located with the first electrode, the first light channel optically coupled to the light emitter and configured to direct light into the subject's tissue. A second sensor element is disposed on the PCB and comprises a second electrode configured to contact the subject's tissue and a second light channel co-located with the second electrode, the second light channel optically coupled to the photodetector and configured to receive light from the tissue of the subject resulting from the light generated by the light emitter.

Example Ex2. The sensor according to Ex1, wherein the first electrode encompasses the first light channel and the second electrode encompasses the second light channel.

Example Ex3. The sensor according to Ex1, wherein the first electrode is situated adjacent the first light channel and does not encompass the first light channel, and the second electrode is situated adjacent the second light channel and does not encompass the second light channel.

Example Ex4 The sensor according to one or more of Ex1 to Ex3, wherein the light emitter comprises a single fixed-wavelength light source or a wavelength-tunable light source.

Example Ex5. The sensor according to one or more of Ex1 to Ex3, wherein the light emitter comprises a plurality of fixed-wavelength light sources or a plurality of wavelength-tunable light sources.

Example Ex6. The sensor according to one or more of Ex1 to Ex5, wherein the light emitter comprises one or more LEDs.

Example Ex7. The sensor according to one or more of Ex1 to Ex6, wherein the light emitter comprises one or more laser diodes.

Example Ex8. The sensor according to one or more of Ex1 to Ex7, wherein the first light channel comprises a light pipe having an outwardly tapered coupling portion that extends beyond a terminal end of the first electrode and is configured to optically couple to a plurality of the light emitters.

Example Ex9. The sensor according to one or more of Ex1 to Ex8, comprising a pressure sensor disposed between the first and second sensor elements, the pressure sensor configured to one or both of sense pressure developed between the electro-optical physiologic sensor and the subject's tissue, and sense pressure changes in tissue in contact with the electro-optical physiologic sensor.

Example Ex10. The sensor according to one or more of Ex1 to Ex9, wherein the first and second electrodes are configured to electrically couple electrical signals between the subject's tissue and bioelectric sensing circuitry disposed on, or coupled to, the PCB.

Example Ex11. The sensor according to Ex10, wherein the bioelectric sensing circuitry is configured to sense changes in one or more of impedance, conductance, resistance, and capacitance of the subject's tissue.

Example Ex12. The sensor according to Ex10, wherein the bioelectric sensing circuitry is configured to sense electrodermal activity of the subject's tissue.

Example Ex13. The sensor according to one or more of Ex1 to Ex12, wherein the light emitter and the photodetector are electrically coupled to optical sensing circuitry disposed on, or coupled to, the PCB.

Example Ex14. The sensor according to Ex13, wherein the optical sensing circuitry is configured to produce a photoplethysmographic signal.

Example Ex15. The sensor according to Ex13, wherein the optical sensing circuitry is configured to produce a pulse oximetry signal.

Example Ex16. An electro-optical physiologic sensor comprises a printed circuit board (PCB), a light emitting unit connected to the PCB, and a light receiving unit connected to the PCB. The light emitting unit comprises a light emitter mounted to the PCB and a first optical window through which light produced by the light emitter can pass into tissue of a subject. The light receiving unit comprises a photodetector mounted to the PCB and a second optical window through which light received from the subject's tissue resulting from the light produced by the light emitter can pass. An optical barrier is disposed between the light emitting unit and the light receiving unit, and at least a tissue contacting surface of the first and second optical windows comprises optically transparent and electrically conductive material. An electrical insulator is disposed between the first and second optical windows.

Example Ex17. The sensor according to Ex16, wherein the first and second optical windows are configured to serve as first and second tissue contact electrodes of the sensor.

Example Ex18. The sensor according to Ex16 or Ex17, wherein the first and second optical windows comprise a transparent conductive oxide (TCO).

Example Ex19. The sensor according to one or more of Ex16 to Ex18, wherein at least a tissue contacting surface of the first and second optical windows comprise ITO (Indium Tin Oxide), AZO (Aluminum-doped Zinc Oxide), IZO (Indium Zinc Oxide) or graphene.

Example Ex20. The sensor according to one or more of Ex16 to Ex19, wherein the light emitting unit and the light receiving unit are disposed in a unitary housing.

Example Ex21. The sensor according to Ex20, wherein the housing comprises one or both of a biocompatible metal and a biocompatible plastic.

Example Ex22. The sensor according to one or more of Ex16 to Ex21, comprising a housing disposed around at least a portion of the light emitting unit and the light receiving unit, and optically transparent fill material disposed within voids of the housing and contacting the first and second optical windows.

Example Ex23. The sensor according to one or more of Ex16 to Ex22, wherein the light emitting unit comprises a third optical window comprising optically transparent and electrically conductive material, the light receiving unit comprises a fourth optical window comprising optically transparent and electrically conductive material, and the first, second, third, and fourth windows are configured to electrically couple electrical signals between the subject's tissue and bioelectric sensing circuitry disposed on, or coupled to, the PCB to perform a 4-electrode electrical measurement.

Example Ex24. The sensor according to Ex23, wherein a second light emitter is mounted to the PCB and configured to produce light that can pass into the subject's tissue via the third optical window, and the photodetector is configured to receive light produced by the light emitter and the second light emitter via the second optical window.

Example Ex25. The sensor according to one or more of Ex16 to Ex24, wherein the light emitter comprises a single fixed-wavelength light source or a wavelength-tunable light source.

Example Ex26. The sensor according to one or more of Ex16 to Ex24, wherein the light emitter comprises a plurality of fixed-wavelength light sources or a plurality of wavelength-tunable light sources.

Example Ex27. The sensor according to one or more of Ex16 to Ex26, wherein the light emitter comprises one or more LEDs.

Example Ex28. The sensor according to one or more of Ex16 to Ex27, wherein the light emitter comprises one or more laser diodes.

Example Ex29. The sensor according to one or more of Ex16 to Ex28, comprising a pressure sensor configured to one or both of sense pressure developed between the electro-optical physiologic sensor and the subject's tissue, and sense pressure changes in tissue in contact with the electro-optical physiologic sensor.

Example Ex30. The sensor according to one or more of Ex16 to Ex29, wherein the first and second optical windows are configured to electrically couple electrical signals between the subject's tissue and bioelectric sensing circuitry disposed on, or coupled to, the PCB.

Example Ex31. The sensor according to Ex30, wherein the bioelectric sensing circuitry is configured to sense changes in one or more of impedance, conductance, resistance, and capacitance of the subject's tissue.

Example Ex32. The sensor according to Ex30, wherein the bioelectric sensing circuitry is configured to sense electrodermal activity of the subject's tissue.

Example Ex33. The sensor according to one or more of Ex16 to Ex32, wherein the light emitter and the photodetector are electrically coupled to optical sensing circuitry disposed on, or coupled to, the PCB.

Example Ex34. The sensor according to Ex33, wherein the optical sensing circuitry is configured to produce a photoplethysmographic signal.

Example Ex35. The sensor according to Ex33, wherein the optical sensing circuitry is configured to produce a pulse oximetry signal.

Figure 1A:
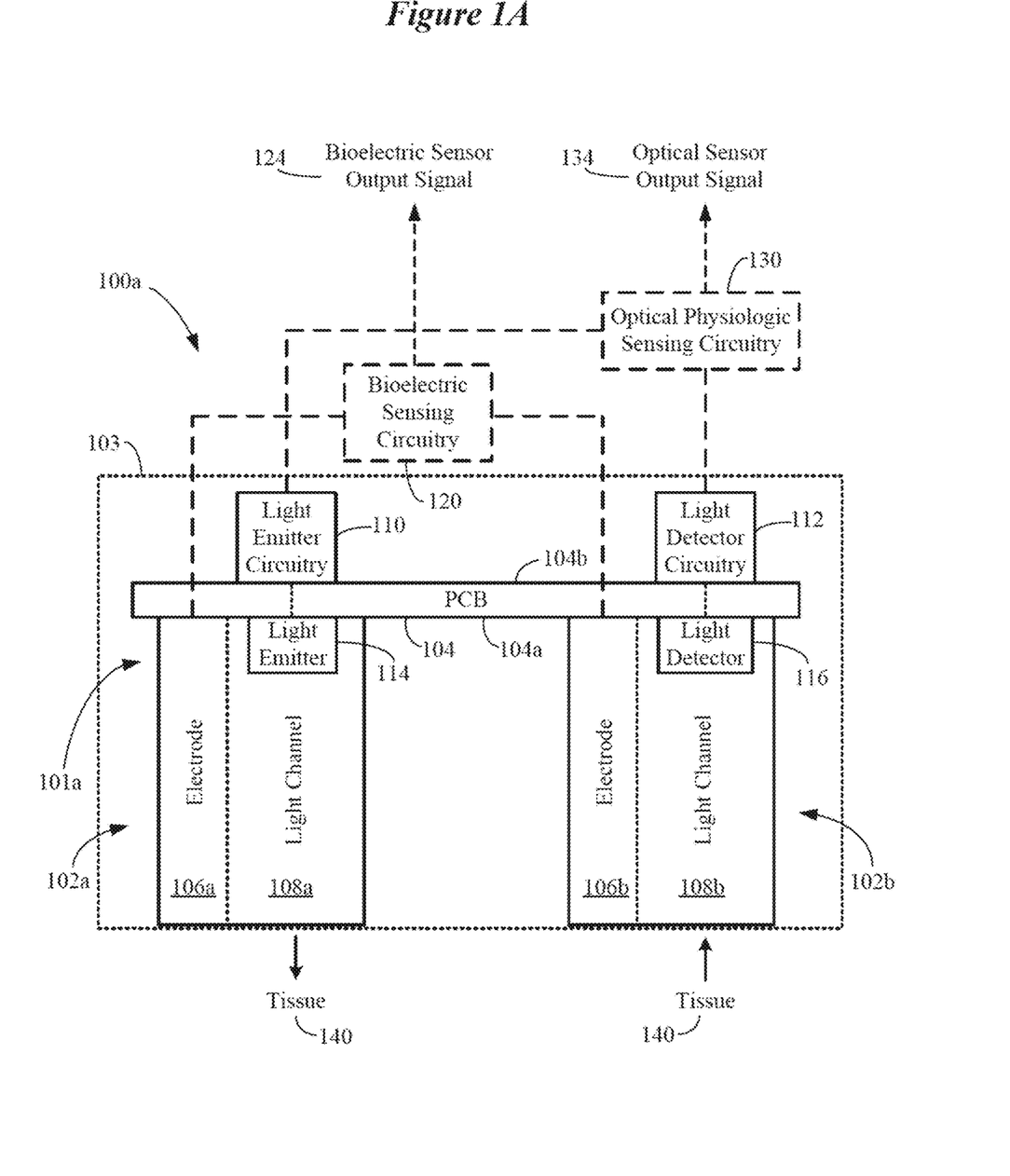
FIG. 1A illustrates an electro-optical physiologic sensor in accordance with any of the embodiments disclosed herein.
Figure 1B:
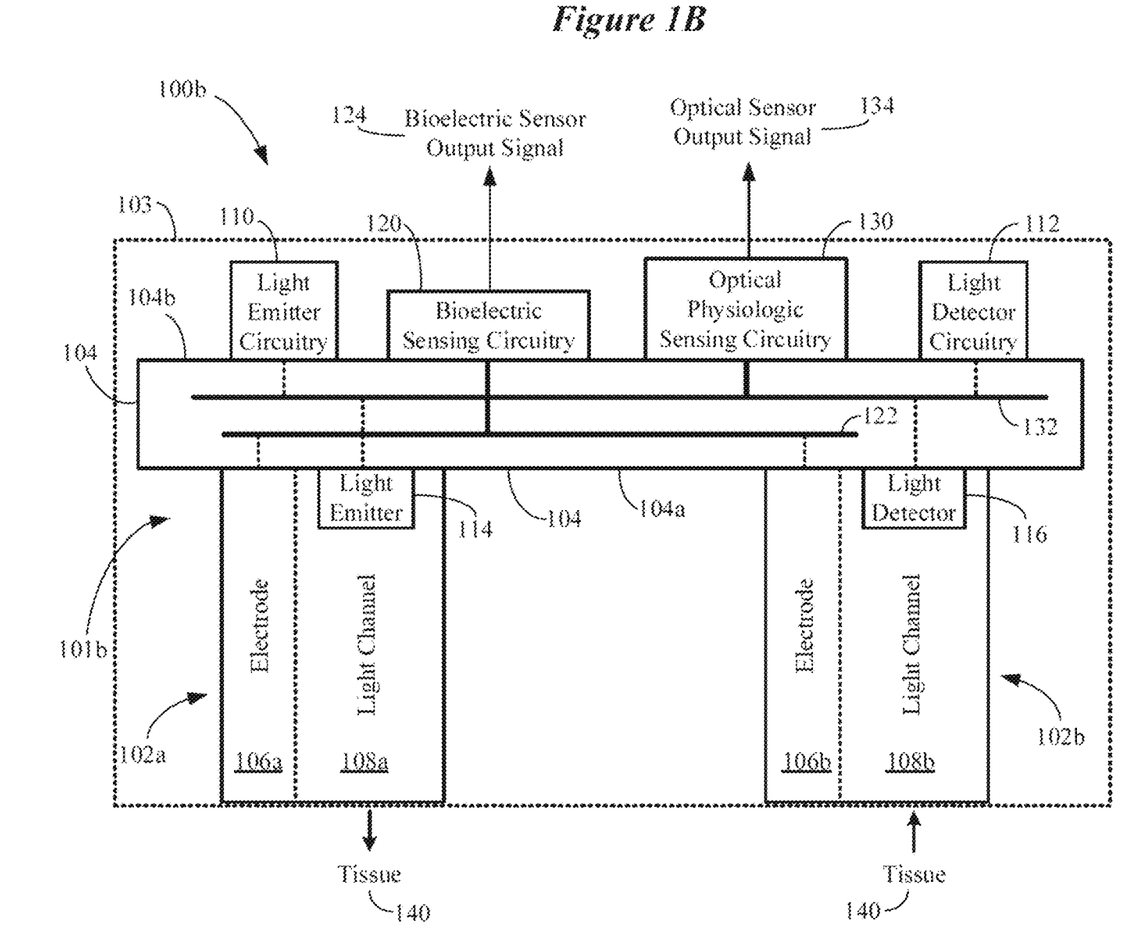
FIG. 1B illustrates an electro-optical physiologic sensor in accordance with any of the embodiments disclosed herein.
Figure 1C:
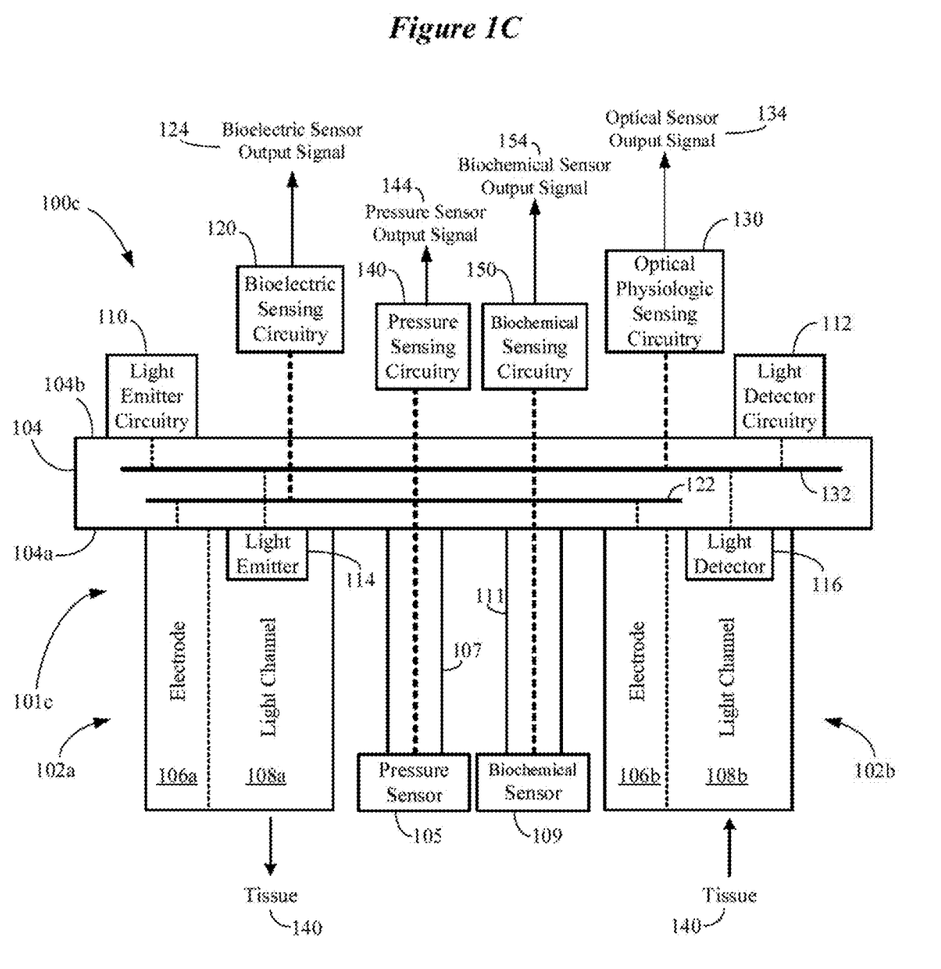
FIG. 1C illustrates an electro-optical physiologic sensor in accordance with any of the embodiments disclosed herein.

FIGS. 1A-1C illustrate an electro-optical physiologic sensor in accordance with various embodiments. The electro-optical physiologic sensor 101a, 101b, 101c shown in FIGS. 1A-1C includes a printed circuit board (PCB) 104 configured to support a number of components of the sensor 101a, 101b, 101c. In FIGS. 1A-1C, a light emitter 114 and a light detector 116 are respectively mounted to a first surface 104a of the PCB 104. A first sensor element 102a is disposed on the first surface 104a of the PCB 104 and comprises a first electrode 106a configured to contact tissue of a subject. The first sensor element 102a also includes a first light channel 108a configured to direct light into the subject's tissue.

A second sensor element 102b is disposed on the first surface 104a of the PCB 104 and comprises a second electrode 106b configured to contact the subject's tissue. As illustrated, the first sensor element 102a is spaced apart from the second sensor element 102b. This spacing can vary depending on the design and intended use of the electro-optical physiologic sensor 101a, 101b, 101c. The second sensor element 102b also includes a second light channel 108b configured to receive light from the subject's tissue resulting from the light generated by the light emitter 114. The electro-optical physiologic sensor 101a, 101b, 101c can be deployed as a stand-alone sensor arrangement or can be integral or coupled to a physiologic sensor arrangement 100a, 100b, 100c which can include other sensing, signal processing, and/or power resources (e.g., bioelectric sensing circuitry 120 and optical physiologic sensing circuitry 130).

As will be described in greater detail hereinbelow, and according to some embodiments, the first electrode 106a can be situated adjacent (e.g., immediately adjacent to, in contact with) the first light channel 108a, such that the first electrode 106a does not encompass the first light channel 108a. The second electrode 106b can be situated adjacent (e.g., immediately adjacent to, in contact with) the second light channel 108b, such that the second electrode 106b does not encompass the second light channel 108b. According to other embodiments, the first electrode 106a can encompass (e.g., circumferentially) the first light channel 108a, and the second electrode 106b can encompass (e.g., circumferentially) the second light channel 108b. According to these and other embodiments disclosed herein, the electrodes 106a, 106b are co-located relative to their corresponding light channel 108a, 108b, which provides for a compact electro-optical physiologic sensor implementation.

As will be described hereinbelow, co-location of the electrodes 106a, 106b with their corresponding light channel 108a, 108b provides a number of advantages including, but not limited to, an optical output signal which can be free or substantially free of motion artifacts resulting from relative movement between the electro-optical physiologic sensor 101a, 101b, 101c and tissue of the subject user. Because the electro-optical physiologic sensor 101a, 101b, 101c incorporates co-located electrodes 106a, 106b and light channels 108a, 108b, the signal produced by the electro-optical physiologic sensor 101a, 101b, 101c does not require additional signal processing to remove motion artifacts, which would otherwise require signals produced by a motion sensor, such as an inertial measurement unit (IMU). As such, devices that incorporate the electro-optical physiologic sensor 101a, 101b, 101c can exclude a motion sensor (e.g., an IMU) typically required to remove motion artifacts from signals produced by conventional optical sensors, thereby facilitating a reduction in the size of such devices.

According to some embodiments, the light emitter 114 can include a single fixed-wavelength light source or a wavelength-tunable light source. In other embodiments, the light emitter 114 can include a plurality of fixed-wavelength light sources or a plurality of wavelength-tunable light sources. In some implementations, the light emitter 114 can include one or more light emitting diodes (LEDs). In other implementations, the light emitter 114 can include one or more laser diodes, such as vertical-cavity surface-emitting laser (VCSEL) diodes or edge-emitting laser diodes. In further implementations, the light emitter 114 can include one or more LEDs and one or more laser diodes. Suitable laser sources include any type of injection laser diode (ILD) or optically pumped semiconductor laser (OPSL). A wavelength-tunable light source can be implemented using an external cavity laser diode, for example. The light emitter circuitry 110 includes circuitry for driving the light emitter 114, such as an LED/laser diode driver, LED/laser diode current control DAC, timing controller, and oscillator.

The light detector 116 can include one or more photodetectors or photon detectors. Suitable photodetectors include photodiodes, metal-semiconductor-metal (MSM) photodetectors, phototransistors, photoconductive detectors, phototubes, and photomultipliers. The light detector circuitry 112 includes circuitry for processing input photodiode signals, such as a differential current-to-voltage transimpedance amplifier, a current digital-to-analog converter (DAC), and an amplifier. The light detector circuitry 112 can be coupled to a processor to calculate physiologic measurements using the output of the light detector circuitry 112. In some embodiments, the electro-optical physiologic sensor 101a, 101b, 101c can be configured as, or includes optical elements (e.g., light channels) of, a photoplethysmogram (PPG) sensor. In such embodiments, the electro-optical physiologic sensor 101a, 101b, 101c is configured as an integrated bioelectric-PPG sensor.

The electro-optical physiologic sensor 101a, 101b, 101c shown in FIGS. 1A-1C can be incorporated in a wide variety of physiologic sensor arrangements which include bioelectric sensing circuitry 120 and optical physiologic sensing circuitry 130. In some embodiments, and with reference to FIG. 1A, the physiologic sensor arrangement 100a includes bioelectric sensing circuitry 120 electrically coupled (via the PCB 104) to the first and second electrodes 106a, 106b of the electro-optical physiologic sensor 101a. The optical physiologic sensing circuitry 130 is electrically coupled to the light emitter circuitry 110 and the light detector circuitry 112 of the electro-optical physiologic sensor 101a. In the embodiment shown in FIG. 1A, bioelectric sensing circuitry 120 and optical physiologic sensing circuitry 130 are operatively coupled to, but physically spaced apart from, the electro-optical physiologic sensor 101a (e.g., not situated in PCB 104). The bioelectric sensing circuitry 120 is configured to produce a bioelectric sensor output signal 124, and the optical physiologic sensing circuitry 130 is configured to produce an optical sensor output signal 134. These output signals 124, 134 can be communicated to other components (e.g., a processor, DSP) of the physiologic sensor arrangement 100a or an external electronic device or system.

In the embodiment shown in FIG. 1B, the physiologic sensor arrangement 100b is configured as an integrated physiologic sensor which includes bioelectric sensing circuitry 120 and optical physiologic sensing circuitry 130 mounted to the PCB 104 of the electro-optical physiologic sensor 101b. The bioelectric sensing circuitry 120 is electrically coupled (via traces 122 of the PCB 104) to the first and second electrodes 106a, 106b of the electro-optical physiologic sensor 101a. The optical physiologic sensing circuitry 130 is electrically coupled (via traces 132 of the PCB 104) to light emitter circuitry 110 and light detector circuitry 112 of the electro-optical physiologic sensor 101b. Although bioelectric sensing circuitry 120 and optical physiologic sensing circuitry 130 are shown mounted to a second surface 104b of the PCB 104 opposing the first surface 104a, one or both of the bioelectric sensing circuitry 120 and optical physiologic sensing circuitry 130 can be mounted to the first surface 104a of the PCB 104. The bioelectric sensing circuitry 120 is configured to produce a bioelectric sensor output signal 124, and the optical physiologic sensing circuitry 130 is configured to produce an optical sensor output signal 134. These output signals 124, 134 can be communicated to other components (e.g., a processor, DSP) of the physiologic sensor arrangement 100b or an external electronic device or system.

In the embodiment shown in FIG. 1C, the electro-optical physiologic sensor 101c is similar to that shown in FIGS. 1A and 1B, but can further include a pressure sensor 105. The pressure sensor 105 is mounted to the first surface 104a of the PCB 104 directly or via a support member 107. The pressure sensor 105 is shown disposed on the PCB 104 between the first and second sensor elements 102a, 102b, but can be located elsewhere on the PCB 104. The pressure sensor 105 can be configured to sense pressure developed between the electro-optical physiologic sensor 101c and tissue of the subject. Alternatively or additionally, the pressure sensor 105 can be configured to sense pressure changes in tissue in contact with the electro-optical physiologic sensor 101c. The pressure sensor 105 can be implemented to include a strain gauge sensor, a MEMS pressure sensor, a thin film pressure sensor, or other pressure sensor technology. Pressure sensing circuitry 140 is provided and configured to produce a pressure sensor output signal 144 using signals produced by the pressure sensor 105. The pressure sensor output signal 144 can be communicated to other components (e.g., a processor, DSP) of the physiologic sensor arrangement 100c or an external electronic device or system.

The electro-optical physiologic sensor 101c can also include a biochemical sensor 109, such as a blood glucose sensor. The biochemical sensor 109 is mounted to the first surface 104a of the PCB 104 directly or via a support member 111. The biochemical sensor 109 is disposed on the PCB 104 between the first and second sensor elements 102a, 102b, but can be located elsewhere on the PCB 104. The biochemical sensor 109 can be implemented as a device capable of converting a chemical or biological quantity into an electrical signal. The biochemical sensor 109 can be configured to interact with one of a variety of body fluids, such as sweat, saliva, tears, and interstitial fluids. In various implementations, the biochemical sensor 109 includes an analyte molecule, a chemically sensitive layer, and a transducer. In some implementations, the biochemical sensor 109 can include a bed of microneedles or microelectrodes.

The biochemical sensor 109 can be configured to sense an ingredient and concentration of one of more body fluids. For example, biochemical sensor 109 can be configured to detect one or more of PH value, Ca+ concentration, and glucose concentration. Biochemical sensing circuitry 150 is provided and configured to produce a biochemical sensor output signal 154 using signals produced by the biochemical sensor 109. The biochemical sensor output signal 154 can be communicated to other components (e.g., a processor, DSP) of the physiologic sensor arrangement 100c or an external electronic device or system.

In some embodiments of the electro-optical physiologic sensor 101c, the bioelectric sensing circuitry 120 and optical physiologic sensing circuitry 130 are operatively coupled to, but physically spaced apart from, the electro-optical physiologic sensor 101c (e.g., see FIG. 1A). In other embodiments of the electro-optical physiologic sensor 101c, the bioelectric sensing circuitry 120 and optical physiologic sensing circuitry 130 are mounted to the PCB 104 of the electro-optical physiologic sensor 101b (e.g., see FIG. 1B). In various embodiments, the pressure sensing circuitry 140 and the biochemical sensing circuitry 150 can be operatively coupled to, but physically spaced apart from, the electro-optical physiologic sensor 101c. In other embodiments, the pressure sensing circuitry 140 and the biochemical sensing circuitry 150 can be mounted to the PCB 104 of the electro-optical physiologic sensor 101c.

As previously discussed, the bioelectric sensing circuitry 120 is configured to produce a bioelectric sensor output signal 124, the optical physiologic sensing circuitry 130 is configured to produce an optical sensor output signal 134, the pressure sensing circuitry 140 is configured to produce a pressure sensor output signal 144, and the biochemical sensing circuitry 150 is configured to produce a biochemical sensor output signal 154. These output signals 124, 134, 144, 154 can be communicated to other components (e.g., a processor, DSP) of the physiologic sensor arrangement 100c or an external electronic device or system.

The bioelectric sensing circuitry 120 shown in FIGS. 1A-1C can be configured to implement one or a number of different electrode-based measurements of the subject's tissue. The electrodes 106a, 106b of the first and second sensor elements 102a, 102b are configured to make electrical contact with tissue of the subject and couple electrical signals between the subject's tissue and the bioelectric sensing circuitry 120. The bioelectric sensing circuitry 120 can be configured to one or more of sense, measure, and monitor changes in one or more of impedance, conductance, resistance, and capacitance of the subject's tissue. The bioelectric sensing circuitry 120 can be configured to one or more of sense, measure, and monitor changes in electrodermal activity of the subject's tissue. The bioelectric sensing circuitry 120 can be configured to measure and monitor electrical activity of various organs of the body, such as a subject's heart (via an electrocardiogram or ECG), musculature (via an electromyogram or EMG), muscle or nerve action potential, brain (via an electroencephalogram or EEG), vision system (via an electrooptigram or EOG, electroretinogram or ERG), stomach (via an electrogastrogram or EGC), and skin (via a galvanic skin reflex or GSR).

The optical physiologic sensing circuitry 130 can be configured to include components of a PPG sensor which utilizes the first light channel 108a of the first sensing element 102a to couple light into tissue of the subject and the second light channel 108b to receive light from the subject's tissue resulting from the light produced by the light emitter 114. The optical physiologic sensing circuitry 130 can be configured to produce a photoplethysmographic signal in response to light received by the light detector 116 via the second light channel 108b. In some embodiments in which at least two light emitters 114 of different wavelengths are included in the first sensing element 102a, the optical physiologic sensing circuitry 130 can be configured to produce a pulse oximetry signal in response to light received by the light detector 116 via the second light channel 108b.

The PPG waveform produced by the optical physiologic sensing circuitry 130 comprises a pulsatile ('AC') physiological waveform attributed to cardiac synchronous changes in the blood volume with each heartbeat, and is superimposed on a slowly varying ('DC') baseline with various lower frequency components attributed to respiration, sympathetic nervous system activity and thermoregulation. The optical sensor output signal 134 produced by the optical physiologic sensing circuitry 130 can be used to perform a number of different physiologic measurements, such as measuring blood oxygen saturation, blood pressure, cardiac output, assessing autonomic function, and detecting peripheral vascular disease. By way of example, the optical sensor output signal 134 produced by the optical physiologic sensing circuitry 130 can be used for measuring and monitoring one or more of heart rate, respiration, vascular condition/disease, arterial condition/disease, compliance and ageing, venous condition/disease, compliance and ageing, endothelial function, microvascular blood flow, vasospastic conditions, autonomic function monitoring, vasomotor function and thermoregulation, heart rate variability, orthostasis, and other cardiovascular variability conditions.

The electro-optical physiologic sensor 101a, 101b, 101c can be enclosed alone or together with other components in a housing 103 (see, e.g., FIGS. 1A and 1B). For example, the housing 103 can be configured to accommodate at least the electro-optical physiologic sensor 101a, 101b, 101c. In some embodiments, the housing 103 can be configured to accommodate at least the electro-optical physiologic sensor 101a, 101b, 101c and one or more of a power source (battery, supercapacitor, inductive or capacitive wireless power receiver), power management circuitry, processor, DSP, DACs, ADCs, amplifiers, filters, wired (e.g., USB) input/output interface and/or wireless (e.g., Bluetooth®, Zigbee®) input/output interface. The housing 103 can be configured for deployment at a specified cutaneous, subcutaneous, transcutaneous, or implantable location of a human or animal subject. The housing 103 can be constructed from materials commonly used in the medical industry. A representative list of biocompatible materials from which the housing 103 can be constructed include silicon dioxide, silicon nitride, Parylene-C, Nafion, biocompatible EPO-TEK® epoxy resin, and platinum.

The electro-optical physiologic sensor 101a, 101b, 101c can be permanently attached to specified tissue of the body, such as by use of sutures and/or structures that encourage fibrous encapsulation (e.g., mesh structures). The electro-optical physiologic sensor 101a, 101b, 101c can be temporarily attached to specified tissue of the body, such as by use of a biocompatible adhesive or sutures. Representative anatomical locations of the body at which the electro-optical physiologic sensor 101a, 101b, 101c can be deployed include the epidermis (skin), arterial and/or venous system, and an organ (e.g., heart, kidneys, brain) of a subject. In some embodiments, the electro-optical physiologic sensor 101a, 101b, 101c is configured for temporary contact with a subject's skin (e.g., a hand-held sensor apparatus), in which case no attachment mechanism or structures need be included.

Figures 2A, 2A:
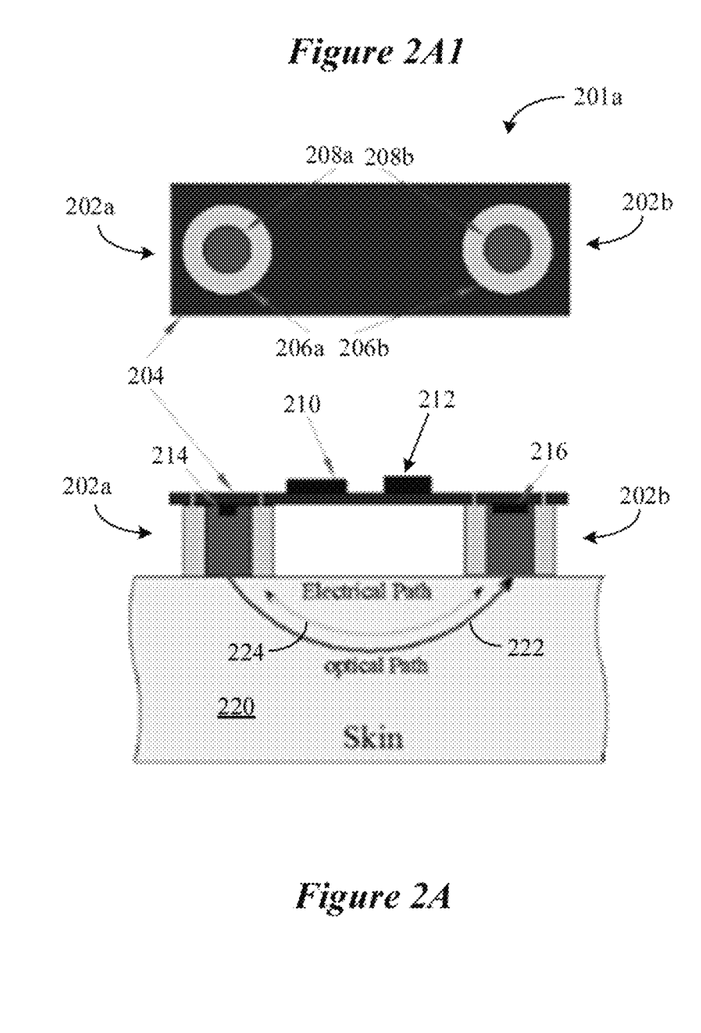
Figure 2B:
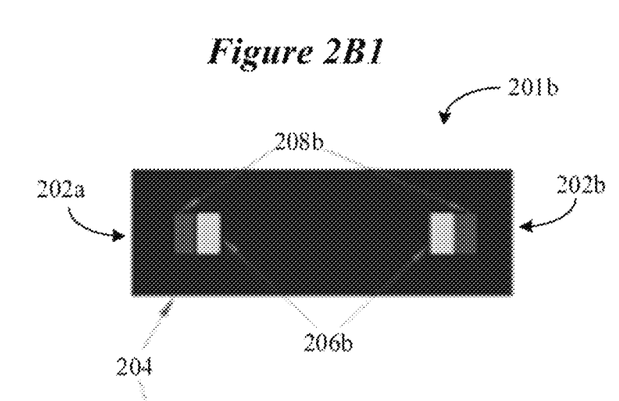
Figure 2B:
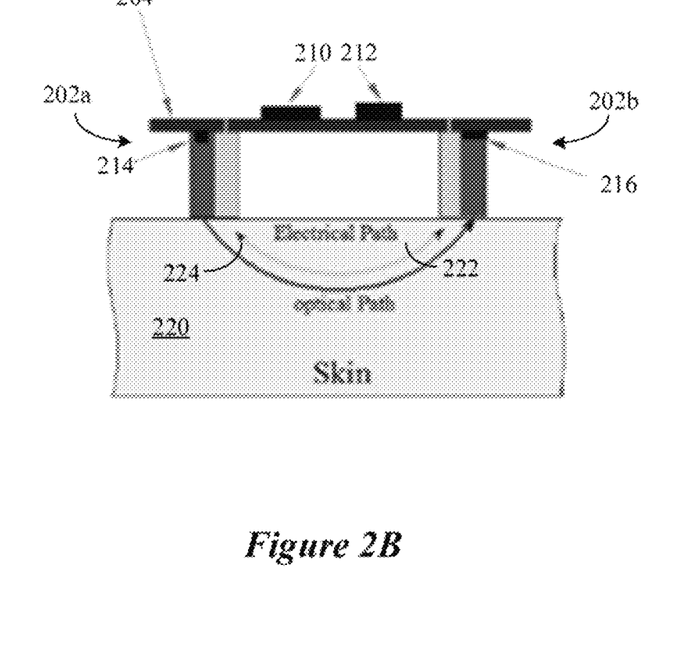
FIG. 2B illustrates an electro-optical physiologic sensor in accordance with any of the embodiments disclosed herein.
Figure 2C:
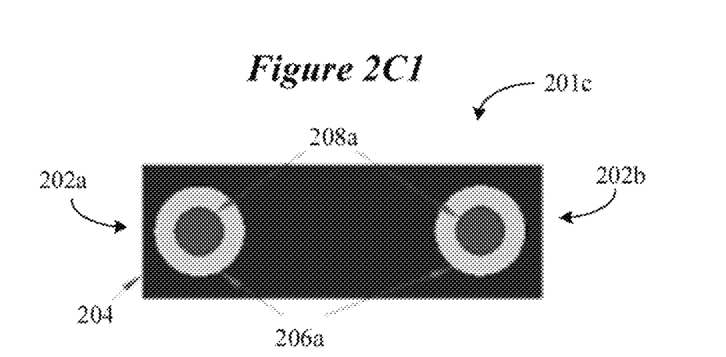
Figure 2C:
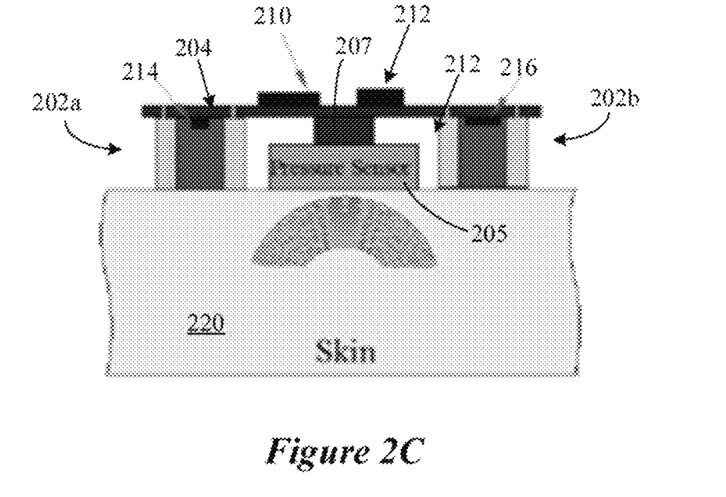
FIG. 2C illustrates an electro-optical physiologic sensor in accordance with any of the embodiments disclosed herein.
Figure 3:
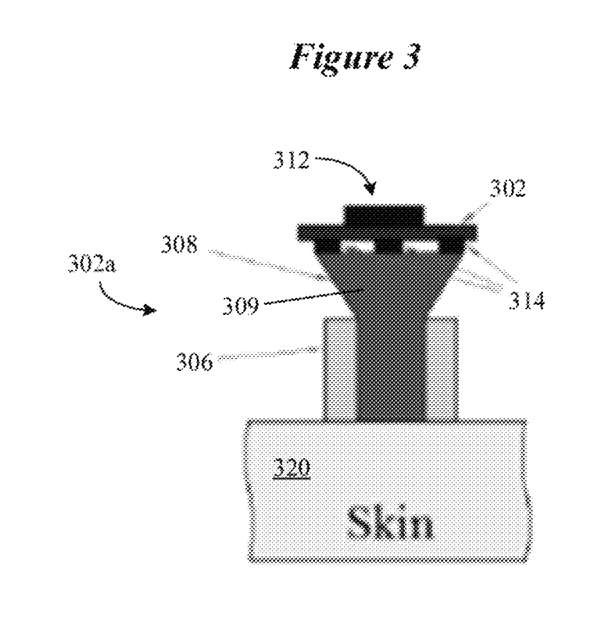
FIG. 3 shows a first sensor element of an electro-optical sensor in accordance with any of the embodiments disclosed herein.

FIGS. 2A-3 illustrate variations of an electro-optical sensor in accordance with any of the embodiments disclosed herein. The electro-optical sensors shown in FIGS. 2A-3 define a compact, integrated sensor that provides for co-location of an optical sensor and an electrode-based sensor at the same location of a subject's tissue (e.g., skin of a person's ear, forehead, a digit, scalp, torso, internal organ or vascular tissue). The electro-optical sensors shown in FIGS. 2A-3 can be incorporated in a wide variety of electronic devices, including any of those disclosed herein. For example, the electro-optical sensors shown in FIGS. 2A-3 can be incorporated in cutaneous, subcutaneous, transcutaneous, and implantable medical and diagnostic devices, physiologic monitoring devices, biometric devices, personal activity monitoring device, personal amplification devices, hearing aids, bone conduction, and medical and consumer hearables.

FIGS. 2A-2C illustrate an electro-optical sensor 201a, 201b, 201c in accordance with any of the embodiments disclosed herein. FIGS. 2A1-2C1 show top views of the electro-optical sensor 201a, 201b, 201c shown in FIGS. 2A-2C. The electro-optical sensor 201a, 201b, 201c shown in FIGS. 2A-2C can be configured as an integrated and compact tissue-contact and physiologic signal sensing module in some implementations. The electro-optical sensor 201a, 201b, 201c includes first and second sensor elements 202a, 202b disposed on a PCB 204. Each of the first and second sensor elements 202a, 202b includes an electrically conductive electrode 206a, 206b and a co-located light channel 208a, 208b. The light channel 208a, 208b is an optical channel (e.g., light pipe) of an optical physiologic sensor, such as a PPG sensor.

In the configurations shown in FIGS. 2A and 2C, the electrically conductive electrode 206a encompasses (e.g., fully encircles) the light channel 208a. As shown, the electrically conductive electrode 206a defines a hollow cylindrical electrode within which the cylindrical light channel 208a is situated. In the configuration shown in FIG. 2B, the electrically conductive electrode 206b and the light channel 208b have a geometric cross-section, such as a square or rectangle. In this configuration, the electrically conductive electrode 206b is situated adjacent to, but does not fully encompass, the light channel 208b.

The PCB 204 is configured to support a light emitter 214 and a photodetector 216. The light emitter 214 can include one or more LEDs or one or more laser diodes of a type previously described. The photodetector 216 can include one or more photodiodes or other light sensor previously described. Circuitry 210 for controlling and driving the light emitter 214 is mounted to the PCB 204. Circuitry 22 for controlling and driving the photodetector 216 is mounted to the PCB 204. As shown, the circuitry 210, 212 is mounted to the surface of the PCB 204 opposing the surface to which the light emitter 214 and photodetector 216 are mounted. It is understood that the circuitry 210, 212 can alternatively be mounted on the same surface of the PCB 204 that supports the light emitter 214 and photodetector 216.

The light channel 208a, 208b of the first sensor element 202a is optically coupled to the light emitter 214 and configured to direct light produced by the light emitter 214 into tissue (e.g., skin) of a subject (e.g., a subject of an ear-worn electronic device which incorporates the electro-optical sensor 201a, 201b, 201c). The light channel 208a, 208b of the second sensor element 202b is optically coupled to the photodetector 216 and configured to receive return light from the tissue of the subject resulting from the incident light generated by the light emitter 214.

According to some implementations, the light channel 208a, 208b can be an optical channel of a PPG sensor configured as a single-wavelength or multi-wavelength photoplethysmography sensor. In the case of a single-wavelength PPG sensor, the light emitter 214 can be configured to emit red light (a wavelength of 660 nm) or infrared (IR, a wavelength of 920 nm). In the case of a multi-wavelength PPG sensor, the light emitter 214 can include two or more light emitting elements, each of which has a different wavelength. For example, a multi-wavelength PPG sensor can include up to four LEDs having different wavelengths, such as IR (e.g., 850 and/or 920 nm), red (e.g., 660 nm), green (e.g., 530 nm), and blue (e.g., 460 nm). It is noted that the PPG sensor can be configured as a pulse oximeter, in which case the light emitter 214 includes at least two LEDs having different wavelengths.

During use of the electro-optical sensor 201a, 201b, 201c, and as is shown in FIGS. 2A and 2B, an electrical path 224 through the subject's tissue 220 (shown as skin for purposes of illustration) is created by current flowing between the electrically conductive electrodes 206a, 206b of the first and second sensor elements 202a, 202b. Concurrently, an optical path 222 is created through the same tissue 220 between the light channels 208a, 208b and corresponding light emitter 214 and photodetector 216. As can be appreciated, the co-located electrically conductive electrodes 206a, 206b and light channels 208a, 208b provide for co-located electrical and optical paths 224, 222 created within the same volume of tissue 220.

The embodiment of the electro-optical sensor 201c shown in FIG. 2C is essentially the same as that shown in FIG. 2A, but further includes a pressure sensor 205 co-located with the first and second sensor elements 202a, 202b. The pressure sensor 205 is physical and electrically (or optically) coupled to the PCB 204 and situated between the first and second sensor elements 202a, 202b. The pressure sensor 205 can be mounted to the PCB 204 directly or via a support member 207. In some implementations, the pressure sensor 205 is configured to sense pressure in response to forceable contact between the electro-optical sensor 201c and tissue (e.g., skin) of the subject. In addition or alternatively, the pressure sensor 205 can be configured to sense pressure changes in tissue in contact with the electro-optical physiologic sensor 201c. The pressure sensor 205 can be implemented to include a strain gauge sensor, a MEMS pressure sensor, a thin film pressure sensor, or other pressure sensor technology. Provision of the pressure sensor 205 provides additional robustness to the electro-optical sensor 201c when implemented as an electro-optical contact sensor. In such of implementations, contact between the electro-optical sensor 201c and a subject's tissue 220 (e.g., skin) can be robustly detected using signals acquired from the electrically conductive electrodes 206a, 206b and the pressure sensor 205.

In some implementations, and in the context of a cutaneous or transcutaneous electro-optical sensor 201c, the pressure sensor 205 can be used to record how much pressure the pressure sensor 205 is applying to the skin 220. Other methods of measuring pressure applied to the skin 220 can be used, including capacitance and microphones, which may need to be calibrated for a specific subject. The pressure sensor 205 can additionally be used to inform the subject when electrodes/sensors of the electro-optical sensor 201c are optimally coupled to the skin when the correct pressure is applied.

FIG. 3 shows a first sensor element 302a of an electro-optical sensor in accordance with any of the embodiments disclosed herein. The first sensor element 302a includes a light channel in the form of a light pipe 308 fully or partially encompassed by an electrically conductive electrode 306 (see, e.g., FIGS. 2A and 2B). The light pipe 308 includes an outwardly tapered coupling portion 309 that extends beyond the electrically conductive electrode 306. The outwardly tapered coupling portion 309 serves to accommodate a multiplicity of light emitters 314 (e.g., two, three, or four light emitters), which provides for increased light output. As shown, the PCB 302 supports three light emitters 314 optically coupled to the light pipe 308 via the outwardly tapered coupling portion 309 and driven by circuitry 312 mounted to the PCB 302.

Figure 4:
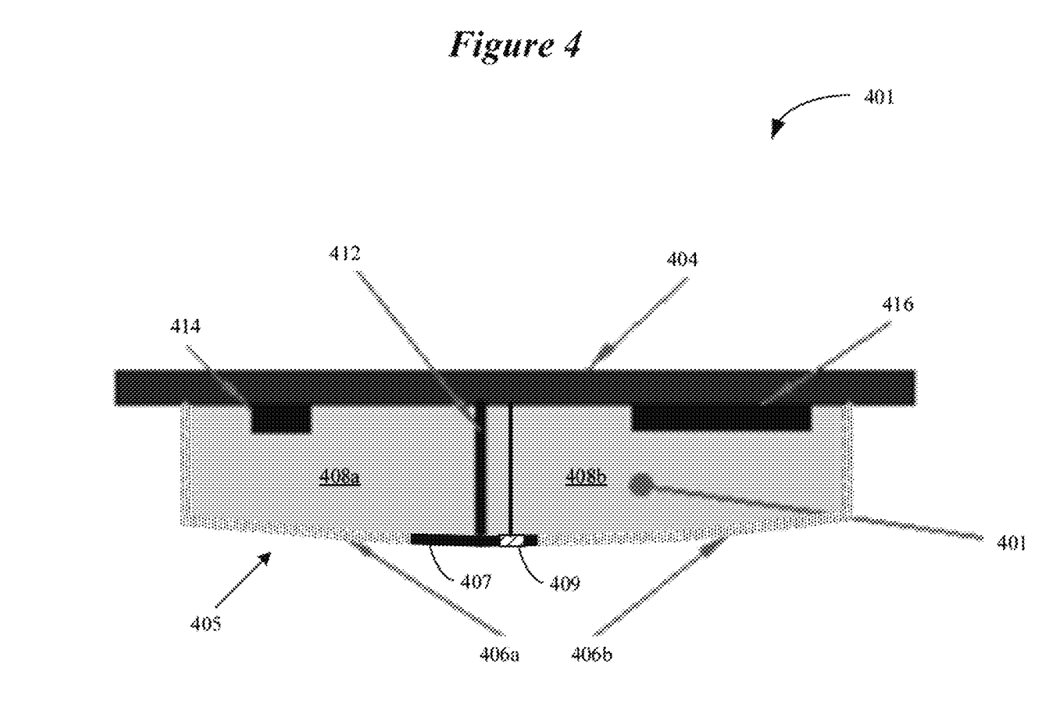
FIG. 4 illustrates an electro-optical physiologic sensor module in accordance with any of the embodiments disclosed herein.

FIG. 4 shows an electro-optical sensor in the form of an electro-optical sensor module 401 in accordance with any of the embodiments disclosed herein. The electro-optical sensor module 401 includes an optical physiologic sensor comprising a light emitter 414 and a photodetector 416 mounted to a PCB 404. The electro-optical sensor module 401 includes a contact surface 405 configured to contact tissue (e.g., skin) of the subject. The contact surface 405 includes a first optical window 406a for the light emitter 414 and a second optical window 406b for the photodetector 416. An optical barrier 412 is disposed between a light emitting unit 408a and a light collection unit 408b of the electro-optical sensor module 401.

The first and second optical windows 406a, 406b are implemented as optically transparent electrical conductors that serve as electrodes of the electro-optical sensor module 401. Various transparent conductive oxides (TCOs) can be used to construct the first and second optical windows 406a, 406b, such as ITO (Indium Tin Oxide), AZO (Aluminum-doped Zinc Oxide), IZO (Indium Zinc Oxide), and graphene. An electrically insulating material 407 (e.g., an electrical insulator material, dielectric material) is disposed on the contact surface 405 between the first and second optical window 406a, 406b to electrically isolate the first and second optical window 406a, 406b. Suitable electrically insulating material 407 includes oxide ceramics and polymers, such as oxides of aluminum, titanium, and yttrium, and alloys thereof.

According to some embodiments, and as previously discussed, the light emitter 414 can include a single fixed-wavelength light source or a wavelength-tunable light source. In other embodiments, the light emitter 414 can include a plurality of fixed-wavelength light sources or a plurality of wavelength-tunable light sources. The first and second optical windows 406a, 406b can be transparent to many wavelengths or designed for only one or more specific wavelengths of the light emitter 414.

In some implementations, at least the light emitting unit 408a and light collection unit 408b can be inserted into a tubular or polygonal housing (see, e.g., FIGS. 1A and 1B) formed from a biocompatible material (e.g., stainless, Ag/AgCl, other material describe herein). As such, the first and second optical windows 406a, 406b that define electrodes of the electro-optical sensor module 401 can have a cylindrical shape or any desired curved and/or polygonal shape. The housing can be filled with a transparent material (epoxy, acrylic, plastic, etc.) such that the transparent fill material contacts the light emitter 414, photodetector 416, first and second optical windows 406a, 406b, and voids of the light emitting and collection unit 408a, 408b.

The optical sensor components (e.g., light emitter 414, photodetector 416) of the electro-optical sensor module 401 are configured to couple light into specified tissue and detect the amount of light returning from the specified tissue, while the electrically conductive first and second optical windows 406a, 406b provide for either capacitive or impedance sensing between these two electrodes. The electro-optical sensor module 401 advantageously provides for the electrical signal being measured to traverse the exact same path through the specified tissue as the optical signal.

In some embodiments, the electro-optical sensor module 401 (or other electro-optical sensor disclosed herein) can be configured to implement a 4-electrode electrical measurement, such as a 4-electrode impedance measurement. For example, the light emitting unit 408a can include a third optical window comprising optically transparent and electrically conductive material of a type previously described. The light receiving unit 408b can include a fourth optical window comprising optically transparent and electrically conductive material of a type previously described. The first, second, third, and fourth optical windows of the electro-optical sensor module 401 can be configured to electrically couple electrical signals between the subject's tissue and bioelectric sensing circuitry disposed on, or coupled to, the PCB to perform a 4-electrode electrical measurement. In some embodiments, a second light emitter can be mounted to the PCB and configured to produce light that can pass into the subject's tissue via the third optical window. The photodetector of the light receiving unit 408b can be configured to receive light produced by the first light emitter and the second light emitter.

The electro-optical sensors and module disclosed herein (e.g., FIGS. 1A-4) can include one or more other sensors, such as one or more pressure sensors, one or more temperature sensors, and/or one or more biochemical sensors to provide additional physiologic signals and enhanced reliability and robustness. In the embodiment shown in FIG. 4, an auxiliary sensor arrangement 409 is situated at the contact surface 405 of the electro-optical sensor module 401. The auxiliary sensor arrangement 409 can include a single sensor, multiple sensors of the same type, or multiple sensors of different types. For example, the auxiliary sensor arrangement 409 can include one or more pressure sensors, one or more temperature sensors, one or more biochemical sensors, or any combination and number of the pressure sensors, temperature sensors, and biochemical sensors disclosed herein.

According to some implementations, the auxiliary sensor arrangement 409 can include one or more temperature sensors. Each temperature sensor can be situated adjacent or within the electrically insulating material 407, which can serve to one or both of electrically and thermally isolate the temperature sensor from other electrical and heat-generating components. In other implementations, one of the electrodes 406a, 406b can be grounded and used as a low thermal path to the temperature sensor(s). One or more temperature sensors can be implemented using various temperature sensing technologies. For example, the temperature sensor(s) can be a thermistor having a negative temperature coefficient (e.g., an NTC thermistor or NTC chip), a positive temperature coefficient (e.g., a PTC thermistor or PTC chip) or a digital thermistor. The temperature sensor(s) can be a surface mount device (SMD) thermistor, thermocouple, resistance temperature detector (RTDs) or other type of resistance temperature sensor.

Thermal paths between the temperature sensor(s) and heat generating components within the electro-optical sensor module 401 or a sensor arrangement incorporating the electro-optical sensor module 401 can be reduced or minimized using conventional techniques. This can be achieved, for example, by using thin copper traces on the PCB 404 (which may be a flexible PCB), removing solid copper ground and power planes, and placing thermal resistive materials between the temperature sensor(s) and heat generating or absorbing components (e.g., an LED, battery).

In some embodiments, the electro-optical sensor module 401 can be configured in a housing that facilitates contact with skin of a subject's forehead or ear. In such embodiments, a temperature sensor or sensors of the auxiliary sensor arrangement 409 can be used as a forehead or ear thermometer together with the optical sensor components configured as a PPG sensor. According to a representative use example, a subject can place the electro-optical sensor module 401 (or an apparatus incorporating the electro-optical sensor module 401) in a sensor mode and place the electrode contacts 406a, 406b on the forehead or the ear canal and wait a few seconds (~5-10 s) followed by the module 401 reporting the subject's temperature, heart rate, $SpO_2$, and any other physiologic metrics computed from the PPG and temperature signals.

The reporting can be implemented wirelessly to a smartphone with a text to speech algorithm that then verbally reports the reading to the subject. Additionally, or alternatively, reporting can be implemented wirelessly to a smartphone configured to display the physiologic metrics graphically via the display of the smartphone.

In some implementations, the electro-optical sensor module 401 or an apparatus incorporating the electro-optical sensor module 401 (e.g., hand-held physiologic monitor) can include or be coupled to a sound generator and audio processing circuitry, and may also or alternatively include a display (e.g., OLED, LCD). In such embodiments, the electro-optical sensor module 401 or an apparatus incorporating the electro-optical sensor module 401 can verbally and/or graphically report the physiologic metrics to the subject or caregiver. The electro-optical sensor module 401 or an apparatus incorporating the electro-optical sensor module 401 may also include a wireless transmitter or transceiver (e.g., Bluetooth®, Zigbee®, IEEE 802.11 radio, cellular radio) configured to wirelessly transmit the physiologic metrics to a remote destination via a communication device, system or network (e.g., tablet, laptop, internet, cloud server).

As discussed previously, and in accordance with a representative use example, an electro-optical sensor of the present disclosure can be implemented as an electro-optical contact sensor. For example, after skin or other tissue contact is detected using the electrodes of the electro-optical sensor, one or more of the temperature, capacitance, impedance, pressure, and/or PPG sensors can be activated to confirm the sensor contact is from a bodily tissue (e.g., by detecting a fast temperature rise, a large PPG signal, a large capacitance or impedance change). By using a combination of sensors, the tissue contact circuit of the electro-optical sensor is very robust to false actuations from sweat, wet hair, rain, and other conditions that may fool or confound a single sensor.

Continuing with another representative use example, one or more electro-optical sensor modules 401 can be incorporated in a medical or consumer device, such as a hearable (e.g., a hearing aid). At least one of the electro-optical sensor modules 401 can be implemented as an electro-optical contact sensor. The subject user can touch the electro-optical sensor module 401 with a finger or thumb (or one finger and a thumb in the case of two modules 401) to take a biometric reading. If the subject user removes their finger from the module 401 before the reading is complete, this action can be interpreted as a button press (e.g., a user input command). If the subject user continues touching the module 401, the readings will complete in ~20-30 s for the most complex measurements such as blood pressure. The one or more modules 401 can then enter a low power state by turning off and waiting for either a timer to take another reading (e.g., every 10 min) or waiting for at least one of the modules 401 to be touched again, or not go into a low power state and continue reading indefinitely during contact with the tissue. In the continuous reading embodiment, the one or more modules 401 can go into a low power state when contact with tissue is no longer sensed, which can be useful in a smartphone/watch application or in a location on a hearing aid that is in continuous contact with the tissue.

According to another representative use example, if an electro-optical sensor module 401 is placed on the body where pressure is sometimes modified during normal daily activities, such as in the ear canal during jaw movements, then the PPG sensor recordings can be used in conjunction with a pressure sensor of the module 401 (see, e.g., FIGS. 1C and 2C) to directly measure the local blood pressure. This works by measuring the pressure at the maximum pulsatile signal from the PPG sensor and the maximum pressure where the pulsatile signal from the PPG sensor is cut off. These two pressure measurements correlate to the local diastolic and systolic blood pressures, respectively.

In a further representative use example, the first and second optical windows 406a, 406b of module 401 (and electrodes shown in any other figures) can be configured to serve as charge contacts that can detachably engage corresponding charge contacts of a charger unit (e.g., a desk-top charger or a portable charging case). By electrically coupling the optical windows 406a, 406b (or electrodes shown in other figures) to electrical contacts of charge circuitry configured to charge a rechargeable power source (e.g., lithium-ion battery) of the apparatus supporting the module 401, contacts of the charger unit can be configured to clean off the optical windows 406a, 406b (or electrodes shown in other figures) on every insertion by using scratching or wiping contacts. In such implementations, it is preferable to construct the optical windows 406a, 406b using a material with a hardness higher than that of the charger contacts to avoid being scratched or damaged.

It is understood that the representative use examples and other illustrative implementation details described above in the context of the electro-optical sensor module 401 shown in FIG. 4 can similarly apply to any of the embodiments and implementations described above with reference to FIGS. 1A-3. It is also understood that the electro-optical sensor module 401 and other electro-optical sensors described above with reference to FIGS. 1A-3 can be implemented in accordance with any of the circuits, devices, and systems disclosed in commonly-owned U.S. Patent Application Ser. No. 63/125,695 filed Dec. 15, 2020, which is incorporated herein by reference in its entirety.

Although reference is made herein to the accompanying set of drawings that form part of this disclosure, one of at least ordinary skill in the art will appreciate that various adaptations and modifications of the embodiments described herein are within, or do not depart from, the scope of this disclosure. For example, aspects of the embodiments described herein may be combined in a variety of ways with each other. Therefore, it is to be understood that, within the scope of the appended claims, the claimed invention may be practiced other than as explicitly described herein.

All references and publications cited herein are expressly incorporated herein by reference in their entirety into this disclosure, except to the extent they may directly contradict this disclosure. Unless otherwise indicated, all numbers expressing feature sizes, amounts, and physical properties used in the specification and claims may be understood as being modified either by the term "exactly" or "about." Accordingly, unless indicated to the contrary, the numerical parameters set forth in the foregoing specification and attached claims are approximations that can vary depending upon the desired properties sought to be obtained by those skilled in the art utilizing the teachings disclosed herein or, for example, within typical ranges of experimental error.

The recitation of numerical ranges by endpoints includes all numbers subsumed within that range (e.g. 1 to 5 includes 1, 1.5, 2, 2.75, 3, 3.80, 4, and 5) and any range within that range. Herein, the terms "up to" or "no greater than" a number (e.g., up to 50) includes the number (e.g., 50), and the term "no less than" a number (e.g., no less than 5) includes the number (e.g., 5).

The terms "coupled" or "connected" refer to elements being attached to each other either directly (in direct contact with each other) or indirectly (having one or more elements between and attaching the two elements). Either term may be modified by "operatively" and "operably," which may be used interchangeably, to describe that the coupling or connection is configured to allow the components to interact to carry out at least some functionality (for example, a radio chip may be operably coupled to an antenna element to provide a radio frequency electric signal for wireless communication).

Terms related to orientation, such as "top," "bottom," "side," and "end," are used to describe relative positions of components and are not meant to limit the orientation of the embodiments contemplated. For example, an embodiment described as having a "top" and "bottom" also encompasses embodiments thereof rotated in various directions unless the content clearly dictates otherwise.

Reference to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout are not necessarily referring to the same embodiment of the disclosure. Furthermore, the particular features, configurations, compositions, or characteristics may be combined in any suitable manner in one or more embodiments.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the disclosure.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

As used herein, "have," "having," "include," "including," "comprise," "comprising" or the like are used in their open-ended sense, and generally mean "including, but not limited to." It will be understood that "consisting essentially of" "consisting of," and the like are subsumed in "comprising," and the like. The term "and/or" means one or all of the listed elements or a combination of at least two of the listed elements.

The phrases "at least one of," "comprises at least one of," and "one or more of" followed by a list refers to any one of the items in the list and any combination of two or more items in the list.

What is claimed is:

1. An electro-optical physiologic sensor of an ear-worn electronic device, comprising:
   a printed circuit board (PCB) disposed in the ear-worn electronic device;
   a plurality of light emitters having different wavelengths and a photodetector respectively mounted to the PCB;
   a first sensor element disposed on the PCB and comprising a first electrode configured to contact tissue of a subject and a first light channel co-located with the first electrode, the first light channel optically coupled to the plurality of light emitters and configured to direct light into the subject's tissue; and
   a second sensor element disposed on the PCB and comprising a second electrode configured to contact the subject's tissue and a second light channel co-located with the second electrode, the second light channel optically coupled to the photodetector and configured to receive light from the tissue of the subject resulting from the light generated by the plurality of light emitters.

2. The sensor of claim 1, wherein:
   the first electrode encompasses the first light channel; and
   the second electrode encompasses the second light channel.

3. The sensor of claim 1, wherein:
   the first electrode is situated adjacent the first light channel and does not encompass the first light channel; and
   the second electrode is situated adjacent the second light channel and does not encompass the second light channel.

4. The sensor of claim 1, wherein the plurality of light emitters comprise a plurality of fixed-wavelength light sources or a plurality of wavelength-tunable light sources.

5. The sensor of claim 1, wherein the plurality of light emitters comprise LEDs.

6. The sensor of claim 1, wherein the plurality of light emitters comprise laser diodes.

7. The sensor of claim 1, wherein the first light channel comprises a light pipe having an outwardly tapered coupling portion that extends beyond a terminal end of the first electrode and is configured to optically couple to the plurality of the light emitters.

8. The sensor of claim 1, comprising a pressure sensor disposed between the first and second sensor elements, the pressure sensor configured to one or both of:
sense pressure developed between the electro-optical physiologic sensor and the subject's tissue; and
sense pressure changes in tissue in contact with the electro-optical physiologic sensor.

9. The sensor of claim 1, wherein the first and second electrodes are configured to electrically couple electrical signals between the subject's tissue and bioelectric sensing circuitry disposed on, or coupled to, the PCB.

10. The sensor of claim 9, wherein the bioelectric sensing circuitry is configured to sense changes in one or more of impedance, conductance, resistance, and capacitance of the subject's tissue.

11. The sensor of claim 9, wherein the bioelectric sensing circuitry is configured to sense electrodermal activity of the subject's tissue.

12. The sensor of claim 1, wherein the plurality of light emitters and the photodetector are electrically coupled to optical sensing circuitry disposed on, or coupled to, the PCB.

13. The sensor of claim 12, wherein the optical sensing circuitry is configured to produce a photoplethysmographic signal.

14. The sensor of claim 12, wherein the optical sensing circuitry is configured to produce a pulse oximetry signal.

15. An electro-optical physiologic sensor of an ear-worn electronic device, comprising:
a printed circuit board (PCB) disposed in the ear-worn electronic device;
a light emitting unit connected to the PCB and comprising a plurality of light emitters having different wavelengths mounted to the PCB and a first optical window through which light produced by the plurality of light emitters can pass into tissue of a subject;
a light receiving unit connected to the PCB and comprising a photodetector mounted to the PCB and a second optical window through which light received from the subject's tissue resulting from the light produced by the plurality of light emitters can pass;
an optical barrier disposed between the light emitting unit and the light receiving unit, and at least a tissue contacting surface of the first and second optical windows comprising optically transparent and electrically conductive material; and
an electrical insulator disposed between adjacent portions of the first and second optical windows.

16. The sensor of claim 15, wherein the first and second optical windows are configured to serve as first and second tissue contact electrodes of the sensor.

17. The sensor of claim 15, wherein the first and second optical windows comprise a transparent conductive oxide (TCO).

18. The sensor of claim 15, wherein at least a tissue contacting surface of the first and second optical windows comprise ITO (Indium Tin Oxide), AZO (Aluminum-doped Zinc Oxide), IZO (Indium Zinc Oxide) or graphene.

19. The sensor of claim 15, wherein:
the light emitting unit comprises a third optical window comprising optically transparent and electrically conductive material;
the light receiving unit comprises a fourth optical window comprising optically transparent and electrically conductive material; and
the first, second, third, and fourth windows are configured to electrically couple electrical signals between the subject's tissue and bioelectric sensing circuitry disposed on, or coupled to, the PCB to perform a 4-electrode electrical measurement.

20. The sensor of claim 19, wherein:
an additional light emitter of the plurality of light emitters is mounted to the PCB and configured to produce light that can pass into the subject's tissue via the third optical window; and
the photodetector is configured to receive light produced by the plurality of light emitters and the additional light emitter via the second optical window.

21. The sensor of claim 15, wherein the plurality of light emitters comprise a plurality of fixed-wavelength light sources or a plurality of wavelength-tunable light sources.

22. The sensor of claim 15, comprising a pressure sensor configured to one or both of:
sense pressure developed between the electro-optical physiologic sensor and the subject's tissue; and
sense pressure changes in tissue in contact with the electro-optical physiologic sensor.

23. The sensor of claim 15, wherein the first and second optical windows are configured to electrically couple electrical signals between the subject's tissue and bioelectric sensing circuitry disposed on, or coupled to, the PCB.

24. The sensor according to claim 15, wherein: the light emitter and the photodetector are electrically coupled to optical sensing circuitry disposed on, or coupled to, the PCB; and the optical sensing circuitry is configured to produce a photoplethysmographic signal.

* * * * *